(12) United States Patent
Workman et al.

(10) Patent No.: US 11,180,821 B2
(45) Date of Patent: Nov. 23, 2021

(54) STUD-WELDABLE REBAR

(71) Applicant: TFP Corporation, Medina, OH (US)

(72) Inventors: Peter A. Workman, Creston, OH (US); Timothy A. White, Medina, OH (US); Samuel T. Ray, West Salem, OH (US)

(73) Assignee: TFP CORPORATION, Medina, OH (US)

( * ) Notice: Subject to any disclaimer, the term of this patent is extended or adjusted under 35 U.S.C. 154(b) by 189 days.

(21) Appl. No.: 16/295,946

(22) Filed: Mar. 7, 2019

(65) Prior Publication Data
US 2020/0283864 A1 Sep. 10, 2020

(51) Int. Cl.
C21D 9/00 (2006.01)
C21D 1/18 (2006.01)
C21D 6/00 (2006.01)
E04C 5/01 (2006.01)
C21D 1/42 (2006.01)
C22C 38/54 (2006.01)
C22C 38/46 (2006.01)
C22C 38/44 (2006.01)
C22C 38/06 (2006.01)
C22C 38/04 (2006.01)
C22C 38/02 (2006.01)
C22C 38/00 (2006.01)

(52) U.S. Cl.
CPC ............ C21D 9/0075 (2013.01); C21D 1/18 (2013.01); C21D 1/42 (2013.01); C21D 6/002 (2013.01); C21D 6/005 (2013.01); C21D 6/008 (2013.01); E04C 5/01 (2013.01); C21D 2221/01 (2013.01); C22C 38/001 (2013.01); C22C 38/002 (2013.01); C22C 38/02 (2013.01); C22C 38/04 (2013.01); C22C 38/06 (2013.01); C22C 38/44 (2013.01); C22C 38/46 (2013.01); C22C 38/54 (2013.01)

(58) Field of Classification Search
CPC .................................... C21D 1/18; E04C 5/01
USPC .......................................................... 148/595
See application file for complete search history.

(56) References Cited

U.S. PATENT DOCUMENTS

| | | | |
|---|---|---|---|
| 815,618 | A | 3/1906 | Mueser |
| 3,960,615 | A * | 6/1976 | Breedijk ................. C22C 38/12 148/337 |
| 5,152,118 | A | 10/1992 | Lancelot |
| 5,776,001 | A | 7/1998 | Carter |
| 6,023,990 | A | 2/2000 | Carr et al. |
| 10,145,113 | B2 | 12/2018 | Houston et al. |
| 2002/0189175 | A1 | 12/2002 | Lancelot, III et al. |

(Continued)

OTHER PUBLICATIONS

Kabir et al. "Hardened Case Properties and Tensile Behaviours of TMT Steel Bars", (American Journal of Mechanical Engineering, 2014, vol. 2, No. 1, 8-14) (Year: 2014).*

Primary Examiner — Coris Fung
Assistant Examiner — Danielle Carda
(74) Attorney, Agent, or Firm — Fay Sharpe LLP

(57) ABSTRACT

A stud-weldable rebar and a method for making the rebar are disclosed. The rebar has a steel body with a weld end and a diameter that is substantially uniform along a length of the body. A tip portion at the weld end includes a hardened zone and a base portion is formed of the remaining steel body. The hardened zone has a hardness that is about 1.5-3.0 times greater than a hardness of the base portion. Induction hardening is used to form the hardened zone.

20 Claims, 1 Drawing Sheet

(56) References Cited

U.S. PATENT DOCUMENTS

| | | |
|---|---|---|
| 2014/0237935 A1 | 8/2014 | Nissen et al. |
| 2014/0325815 A1 | 11/2014 | Dahl |
| 2017/0247884 A1 | 8/2017 | Houston et al. |

\* cited by examiner

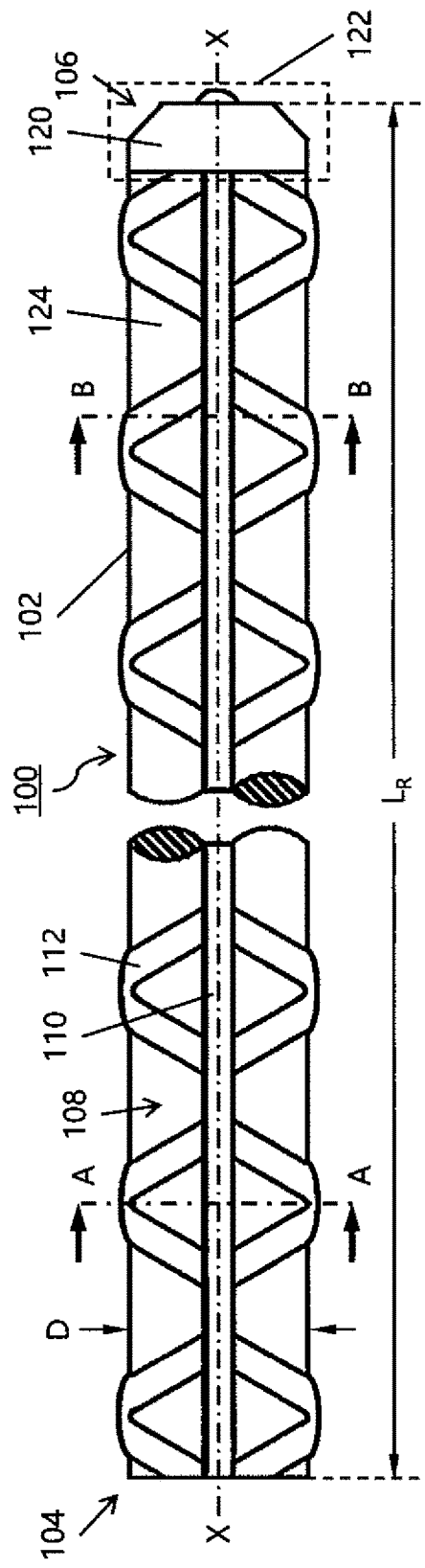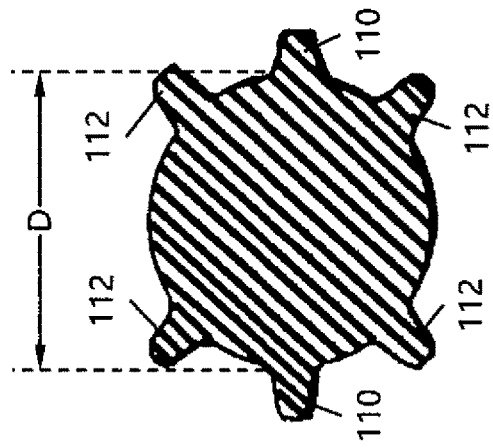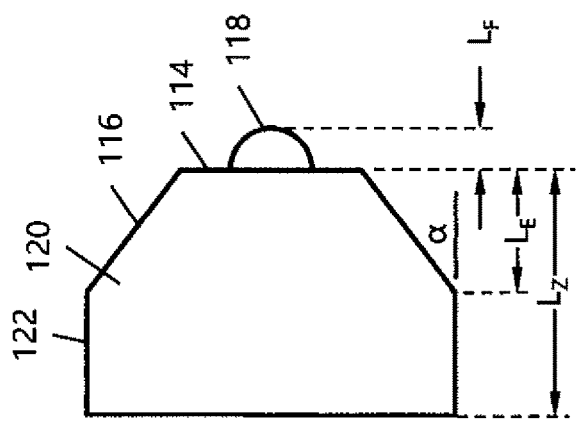

STUD-WELDABLE REBAR

BACKGROUND

The present disclosure relates to deformed reinforcing bar ("rebar") products along with methods for forming the same. Although the rebar is particularly useful for stud-welding to other base metals, the rebar is primarily used in concrete reinforcement applications where specific industry standards must be met, such as reinforced concrete structures which are subject to seismic activity.

Rebar and deformed bar products are manufactured to meet specific industry standards, such as ASTM International Designation A706/A706M-16, Standard Specification for Deformed and Plain Low-Alloy Steel Bars for Concrete Reinforcement ("ASTM A706/A706M"), the contents of which are incorporated herein. Rebar and deformed bar products used in structures subject to seismic activity must also meet the requirements set forth in American Concrete Institute 318-14, Building Code Requirements for Structural Concrete ("ACI 318-14"), the contents of which are also incorporated herein. ASTM A706/A706M compliant steel is commonly used for the reinforcement of concrete in seismic-risk areas.

Certain structures require the fastening of rebar to a base metal. One technique for fastening rebar to a base metal includes the use of threaded ends and fasteners. However, this technique can be time consuming and requires additional equipment to manufacture and assemble the rebar and base metal structure. Another technique for fastening rebar to a base metal includes welding. The "weldability" of bar products is generally dependent on chemical composition and the carbon equivalent value ("CEV") of the material used to manufacture the bar product. The standards in ASTM A706/A706M incorporate limited chemical compositions and CEVs for weldable material and recommend compliance with the American Welding Society D1.1/1.1M: 2015, Structural Welding Code for Steel ("AWS D1.1/1.1M"), the contents of which are additionally incorporated herein. However, while some materials and welding processes are compliant with the aforementioned standards, they nevertheless suffer drawbacks such as being time consuming and requiring specialized pre-treatments and equipment.

Stud-welding is a fastening process that improves rebar and base metal assembly time. However, the steel material used to form the rebar must be selected to have a lower CEV range than the maximum allowed in ASTM A706/A706M, otherwise the steel rebar would not be "stud-weldable". Moreover, existing stud-weldable rebar made from ASTM A706/A706M compliant steel still requires additional physical deformation steps and specialized equipment, which ensue increase in cost and difficulty of manufacturing.

It would be desirable to develop a new stud-weldable rebar formed from ASTM A706/A706M compliant steel which overcomes the drawbacks of the prior art, such as those discussed above.

BRIEF DESCRIPTION

The present disclosure relates to rebar products suitable for concrete reinforcement in applications where mechanical properties are controlled to achieve necessary tensile and yield strength. The present disclosure also relates to steel rebar made from a material with a restricted chemical composition necessary to achieve stud-weldability.

In accordance with one aspect of the present disclosure, a stud-weldable rebar is provided that has a steel body with a weld end and a diameter that is substantially uniform along a length of the body. The body has a tip portion at the weld end and a base portion formed of the remaining steel body. The tip portion includes a hardened zone with a hardness that is about 1.5-3.0 times greater than a hardness of the base. More particularly, the hardness of the hardened zone is about 2-2.5 times greater than the hardness of the base portion. As measured on the Rockwell scale, the hardness of the hardened zone is about 20-50 HRC. The hardened zone has a length, and the length of the hardened zone is about 30-50% the diameter of the body. More particularly, the length of the hardened zone is about 40% the diameter of the body. The tip portion can further include a terminal surface at the weld end and a chamfered edge that is located adjacent the terminal surface. The chamfered edge extends a length that is about 20-45% the length of the hardened zone. More particularly, the chamfered edge length extends about 22.5-40% the length of the hardened zone. The tip portion further includes a flux load fixed to the terminal surface at the weld end and The flux load has a length that is about 10-25% the length of the hardened zone. More particularly, the length of the flux load is about 12.5-20% the length of the hardened zone. The chemical composition of the steel body includes 0.08-0.23 wt % of carbon, 0.95-1.2 wt % of manganese, less than 0.25 wt % of copper, less than 0.15 wt % of nickel, less than 0.15 wt % of chromium, 0.001-0.05 wt % of molybdenum, and 0.03-0.08 wt % vanadium. More particularly, the chemical composition of the steel body includes 0.08-0.23 wt % of carbon, 0.95-1.2 wt % of manganese, less than 0.04 wt % of phosphorous, less than 0.05 wt % of sulfur, 0.2-0.4 wt % of silicon, less than 0.25 wt % of copper, less than 0.15 wt % of nickel, less than 0.15 wt % of chromium, 0.001-0.05 wt % of molybdenum, 0.001-0.02 wt % of aluminum, 0.03-0.08 wt % vanadium, less than 0.0005 wt % of boron, and less than 0.02 wt % of nitrogen. In any event, the chemical composition of the steel body includes a carbon equivalency value between 0.31-0.42%.

In accordance with another aspect, a method of forming a stud-weldable rebar is disclosed. The method includes providing a steel body with a weld end and a diameter that is substantially uniform along a length of the body. Next, the method includes heating a portion of the weld end for about 4-9 seconds until the portion of the weld end reaches a target temperature of about 1,300-1,700° F. Then, the heated portion of the weld end is allowed to rest for a dwell time of about 2 seconds. Finally, the method includes cooling the heated portion of the weld end by quenching in a cooling medium for about 5-12 seconds. As a result, the hardness of the weld end portion is increased by about 1.5-3 times the hardness of the remaining portion of the steel body. More particularly, the hardness of the hardened weld end portion is about 20-50 HRC. The length of the hardened weld end portion is about 40% the nominal diameter of the steel body. The method also includes providing a steel body having a chemical composition of 0.08-0.23 wt % of carbon, 0.95-1.2 wt % of manganese, less than 0.04 wt % of phosphorous, less than 0.05 wt % of sulfur, 0.2-0.4 wt % of silicon, less than 0.25 wt % of copper, less than 0.15 wt % of nickel, less than 0.15 wt % of chromium, 0.001-0.05 wt % of molybdenum, 0.001-0.02 wt % of aluminum, 0.03-0.08 wt % vanadium, less than 0.0005 wt % of boron, and less than 0.02 wt % of nitrogen. The method further includes restricting the chemical composition of the steel body to a carbon equivalency value between 0.31-0.42%.

In accordance with yet another aspect, a stud-weldable rebar is disclosed which includes a steel body having first end, a weld end, and a cylindrical outer surface. The cylindrical outer surface defines a diameter that is substantially uniform along all points of the steel body. A tip portion at the weld end includes a hardened zone, a terminal surface, and a flux load fixed to the terminal surface. A base portion is defined between the first end and the tip portion of the steel body. The hardened zone has a length that is about 30-50% the total diameter of the steel body and a hardness that is about 1.5-3.0 times greater than the hardness of the base portion of the steel body. More particularly, the hardness of the hardened zone is about 20-50 HRC and the hardness of the base portion of the steel body is about 90-98 HRB. In addition, the length of the hardened zone is more particularly about 0.150-0.400 inches.

These and other non-limiting characteristics of the disclosure are more particularly disclosed below.

BRIEF DESCRIPTION OF THE DRAWINGS

The following is a brief description of the drawings, which are presented for the purposes of illustrating the exemplary embodiments disclosed herein and not for the purposes of limiting the same.

FIG. 1 is a side view of a deformed reinforcing bar according to the present disclosure which includes a hardened zone formed on a weld end of the bar;

FIG. 2 is a side view of the tip portion of the deformed reinforcing bar of FIG. 1 which has been enlarged to more clearly show the elements and features of the tip portion;

FIG. 3 is a transverse right-angled cross-section of the deformed reinforcing bar in FIG. 1 taken on the plane of line AA; and, FIG. 4 is a transverse right-angled cross-section of the deformed reinforcing bar in FIG. 1 taken on the plane of line BB.

DETAILED DESCRIPTION

A more complete understanding of the components, processes and apparatuses disclosed herein can be obtained by reference to the accompanying drawings. These figures are merely schematic representations based on convenience and the ease of demonstrating the present disclosure, and are, therefore, not intended to indicate relative size and dimensions of the devices or components thereof and/or to define or limit the scope of the exemplary embodiments.

Although specific terms are used in the following description for the sake of clarity, these terms are intended to refer only to the particular structure of the embodiments selected for illustration in the drawings and are not intended to define or limit the scope of the disclosure. In the drawings and the following description below, it is to be understood that like numeric designations refer to components of like function.

The term "about" can be used to include any numerical value that can vary without changing the basic function of that value. When used with a range, "about" also discloses the range defined by the absolute values of the two endpoints, e.g. "about 2 to about 4" also discloses the range "from 2 to 4." The term "about" may refer to plus or minus 10% of the indicated number.

The rebar described in the present application is produced from a low carbon steel having a restricted chemical composition that complies with industry standards set forth in ASTM A706/A706M. The dimensional and strength requirements detailed in ASTM A706/A706M are also met by the rebar product described in the present application.

As used herein, the terms "steel", "A706 steel", "low-alloy steel", "low carbon steel", etc., can be used interchangeably and generally refer to a steel material that meets the requirements set forth in ASTM A706/A706M. Moreover, when used herein, these material-related terms generally refer to bars made of "Grade 60" steel, defined in ASTM A706/A706M as having a minimum yield strength of 60,000 psi. However, the concepts in this application can apply equally to other steels without departing from the scope of the disclosure. For example, "Grade 80" steel, defined in ASTM A706/A706M as having a minimum yield strength of 80,000 psi, could also be used. Similarly, while deformed reinforcing bars are specifically referred to herein, the concepts of this application can apply equally to plain reinforcing bars without departing from the scope the disclosure.

The steel material used to form the rebar of the present disclosure has a composition that also meets the stud-weldability requirements set forth in AWS D1.1/1.1M-15. The "stud-weldability" of the presently disclosed rebar is achieved by induction hardening of a tip portion of the rebar to form a hardened zone at the weld end of the bar. In this regard, the hardened zone essentially divides the rebar into a tip portion containing the hardened zone and a softer base portion. A specific length and Rockwell hardness define the induction hardened zone as discussed in further detail below. The "stud-weldability" of the rebar described herein provides a more practical and time saving method for attaching rebar to a base metal. The rebar and base metal assembly process is commonly required in concrete reinforcement applications, including the construction of structures which are prone to seismic activity. As such, the presently disclosed rebar is further compliant with the standards set forth in ACI 318-14.

FIG. 1 is a side view of a section of rebar 100 in accordance with the present disclosure. FIG. 2 is a side view of a tip portion of the rebar 100 which has been enlarged to more clearly show the elements and features thereof. FIGS. 3 and 4 illustrate transverse right-angled sections of the rebar 100 taken along planes of the lines A-A and B-B, respectively. Stock rebar material (not shown) is generally provided in coil or long stock form. Desired length sections of rebar can be cut directly from long stock, whereas coil stock usually needs to be de-coiled before cutting.

Rebar 100 can be cut from coil or long stock to form a longitudinal body section 102 that extends a length $L_R$ along axis X. The rebar body 102 includes a first end 104 and a second or weld end 106. An outer surface 108 is generally cylindrical in shape and defines a diameter D of the body 102. As illustrated in FIGS. 1, 3, and 4, a plurality of ribs/deformations 110/112 can be formed on the outer surface 108. The ribs/deformations 110/112 project outward from the outer surface 108 to a height H, as is typical in deformed reinforcing bars. Ignoring the height H of any ribs/deformations that may be present and/or any other optional surface features of the rebar body 102 (e.g., chamfered edge portion 116 described in further detail below), the rebar diameter D is substantially uniform at all points along length La.

Each rib/deformation 110/112 can be formed to have the same or different height as other ribs/deformations in the plurality. The present application is not limited by specific values for the height H of the ribs/deformations 110/112. However, ASTM A706/A706M provides values for the minimum average height of deformations depending on the nominal bar size or diameter, along with other general requirements and guidelines for deformation height. Rebar made according to the present disclosure would generally follow these requirements and guidelines. Moreover, several shaped regions are defined between adjacent ribs/deformations on the outer surface 108 of the rebar body 102. These shaped regions help anchor the rebar to an associated construction material such as concrete. While the ribs/deformations 110/112 are illustrated as having a specific size, shape, arrangement, etc., these characteristics are non-limiting and can be changed as desired to suit a variety of different circumstances and applications, provided the requirements set forth in ASTM A706/A706M and the additional limitations set forth below are met.

As best shown in FIGS. 1 and 2, a tip portion 122 of the rebar body is located at the second or weld end 106. The tip portion 122 generally includes terminal surface 114, one or more optional surface features such as chamfered edge 116, flux load 118, and hardened zone 120. The remaining portion of rebar body, i.e., the portion of body other than tip 122, is referred to as a base portion 124. In other words, base portion 124 generally refers to the portion of rebar body 102 that is between the first end 104 and the tip portion 122. The terminal surface 114 of the tip portion 122 is generally flat and extends transversely to axis X. However, the specific shape of the terminal surface is non-limiting. For example, the terminal surface could be hemispherical in shape instead of flat.

The optional chamfered edge 116 of tip 122 can be included to transition between the outer surface 108 of the rebar body 102 and terminal surface 114. As illustrated, the chamfered edge 116 slopes radially inward at a desired angle α and for a desired length $L_E$ along axis X. The length $L_E$ which chamfered edge 116 extends can be increased or decreased depending on the diameter D of the rebar body 102, however this is not required. As discussed in further detail below, the length $L_E$ which chamfered edge 116 extends can also be related to the size of the hardened zone 120. In some particular embodiments, the chamfered edge 116 slopes radially inward at an angle α of about 43 degrees to about 47 degrees, including about 45 degrees. However, at other angles can also be used without departing from the scope of the present disclosure. Various exemplary chamfered edge lengths $L_E$ are provided in Table 1 below.

The flux load 118 is disposed on the terminal surface 114 of the tip portion 122 at weld end 106. The flux load 118 is a ball of aluminum that is subsequently embedded, pressed, or otherwise fixed to the terminal surface 114. In this regard, the terminal surface 114 can include a pre-formed depression (not shown) where the metal ball is embedded, pressed, or otherwise affixed to form the flux load 118. After being fixed to the terminal surface, the flux load 118 extends out of the terminal surface a length $L_F$ along axis X. The size (i.e., length $L_F$) of the flux load 118 can be increased or decreased depending on the diameter D of the rebar body 102, however this is not required. As discussed in further detail below, length $L_F$ of the flux load 118 can also be related to the size of the hardened zone 120. Various exemplary flux load lengths $L_F$ are provided in Table 1 below.

The tip portion 122 at the weld end 106 also includes a zone where at least one mechanical property has been modified. More particularly, the tip includes a hardened zone 120 at the weld end 106 that is formed by rapid heating and cooling. The heating is preferably achieved by induction heating, followed by a rapid quench in a cooling medium such as water. The induction hardening process used herein advantageously produces a martensitic microstructure at hardened zone 120 which is harder than the base A706 material used to form rebar 100. In addition, the martensitic microstructure extends from the outer surface to the core of the rebar body 102 at hardened zone 120. Induction heating is also advantageous because it permits hardening of a selected area (e.g., hardened zone 120) without significantly affecting the mechanical properties of the portions of rebar surrounding the selected area. As a result, the tip portion 122 (excluding flux load 118) has a greater hardness than the base portion 124 of the rebar body 102. It should be noted that the flux load 118 of the tip portion 122 can be fixed to the terminal surface 114 before or after zone 120 has undergone hardening. However, regardless of whether the flux load is fixed before or after induction hardening, the hardness properties of flux load are independent from those of the hardened zone.

As shown in FIGS. 1 and 2, the hardened zone 120 extends longitudinally along axis X for a length $L_Z$. The size (i.e., length $L_Z$) of the hardened zone 120 can be increased or decreased depending on the diameter D of the rebar body 102, however this is not required. In many applications, the relationship between hardened zone length $L_Z$ and rebar diameter is that larger rebar sizes will require larger hardened zones at the weld end. In other words, the length $L_Z$ of the hardened zone is directly proportional to the diameter of the rebar. Various exemplary lengths $L_Z$ for the hardened zone 120 are provided in Table 1 below.

In some embodiments, the hardened zone 120 has a length $L_Z$ that is about 30-50% the rebar diameter D. Preferably, the length $L_Z$ of the hardened zone 120 is about 40% the rebar diameter D. Rebar is commonly provided in nominal diameters of ⅜", ½", ⅝", ¾", ⅞", and 1". Thus, when the diameter D of rebar body 102 is equal to these nominal sizes, the preferred length $L_Z$ of hardened zone 120 is from about 0.150" to about 0.400". Based on these hardened zone sizes, the chamfered edge 116 can extend a length $L_E$ that is about 20-45% the length $L_Z$ of the hardened zone 120. Preferably, the chamfered edge 116 extends a length $L_E$ that is about 22.5-40% the length $L_Z$ of the hardened zone 120. In addition, the flux load 118 can have a length $L_F$ that is about 10-25% the length $L_Z$ of the hardened zone 120. Preferably, the flux load 118 has a length $L_F$ that is about 12.5-20% the length $L_Z$ of the hardened zone 120.

In some embodiments, the hardened zone 120 of the tip portion 122 has a hardness that is about 1.5-3 times greater than a hardness of the base portion 124. Preferably, the hardened zone 120 is about 2-2.5 times harder than the base portion 128 of the rebar body 102. In other words, the hardening process described herein increases the hardness of zone 120 at the weld end 106 by about 120-150% compared to the rest of rebar body 102. In some particular embodiments, the hardened zone 120 has a Rockwell hardness of about 20-50 HRC, and the base portion 124 has a Rockwell hardness of about 90-98 HRB. Importantly, it should be noted that the induction hardening process penetrates to the core of the rebar body 102, such that the hardness of about 20-50 HRC is present from the outer surface to the core at the hardened zone 120.

Table 1 below provides exemplary values for the dimensional variables illustrated in FIGS. 1-4 and discussed above, including diameter D, length $L_R$ of the rebar body, size or length $L_F$ of the flux load, size or length $L_Z$ of the hardened zone, and length $L_E$ of the chamfered edge. The rebar diameters listed in Table 1 correspond to nominal bar sizes that are commonly available in the industry. Table 1 also provides preferred values for "burn-off", which refers to the amount of rebar body 102 consumed during stud welding at the weld end 106. The "burn-off" material generally forms the weld fillet.

TABLE 1

Preferred Values for the Dimensional Variables of the Stud-Weldable Rebar

| Rebar diameter (D), in. | Rebar length ($L_R$), in., ±0.031 | Flux length ($L_F$), in. | Hardened zone length ($L_Z$), in., +.062/−.000 | Chamfered edge length ($L_E$), in., α = 45°, ±2 | Burn-Off, in. |
|---|---|---|---|---|---|
| 3/8 | 8-120 | 0.030 | 0.150 | 0.060 | 0.1250 |
| 1/2 | 8-120 | 0.030 | 0.200 | 0.070 | 0.1250 |
| 5/8 | 8-120 | 0.040 | 0.250 | 0.090 | 0.1875 |
| 3/4 | 8-120 | 0.050 | 0.300 | 0.090 | 0.1875 |

The materials from which rebar and deformed bar products are manufactured are required to meet specific industry standards. The material used to form the stud-weldable rebar 100 of the present disclosure meets the requirements set forth in ASTM A706/A706M. In other words, the stud-weldable rebar 100 is manufactured from A706 steel, grade 60, as set forth in ASTM A706/A706M. In addition, the stud-weldable rebar 100 complies with the requirements set forth in AWS D1.1/1.1M-15 and the standards set forth in ACI 318-14.

As mentioned briefly above, ASTM A706/A706M provides a maximum CEV for steel rebar material to be considered weldable. In particular, ASTM A706/A706M states that deformed bar material can have a CEV of up to 0.55 percent and still be considered "weldable". However, CEV values as high as 0.55 percent are not acceptable for stud-welding. Accordingly, the chemical composition of the steel material used to form rebar 100 must be restricted to obtain an acceptable CEV range which ensures the stud-weldability of the rebar. The CEV of a chemical composition can be calculated according to the formula:

$$CEV = \% \, C + \frac{\% \, Mn}{6} + \frac{\% \, Cu}{40} + \frac{\% \, Ni}{20} + \frac{\% \, Cr}{10} - \frac{\% \, Mo}{50} - \frac{\% \, V}{10}.$$

The following Table shows a preferred material composition for A706 steel which achieves an acceptable range of CEV values. These values ensure the stud-weldability of rebar 100. The material can be used to make stud-weldable rebar 100 by restricting the CEV to a range of about 0.31 percent to about 0.42 percent.

TABLE 2

Preferred A706 Material Composition for the Stud-Weldable Rebar

| Element | Preferred range, wt % |
|---|---|
| Carbon (C) | 0.08-0.230 |
| Manganese (Mn) | 0.95-1.20 |
| Phosphorous (P) | 0.04 max |
| Sulfur (S) | 0.05 max |
| Silicon (Si) | 0.2-0.4 |
| Copper (Cu) | 0.250 max |
| Nickel (Ni) | 0.150 max |
| Chromium (Cr) | 0.150 max |
| Molybdenum (Mo) | 0.001-0.050 |
| Aluminum (Al) | 0.001-0.020 |
| Vanadium (V) | 0.030-0.080 |
| Boron (B) | 0.0005 max |
| Nitrogen (N) | 0.020 max |

The restricted chemical composition listed in Table 2 above achieves a CEV in the range of about 0.31 percent to about 0.42 percent, which is acceptable for stud-welding. Applicant has surprisingly found that by: (a) hardening the rebar weld end as discussed in greater detail above; and (b) restricting the steel material composition to obtain a CEV in the range of about 0.31-0.42% as shown in Table 2 above, a low-alloy steel deformed bar 100 can be provided which meets applicable industry standards, including those set forth in ASTM A706/A706M, AWS D1.1/1.1M, and ACI 318-14.

An exemplary method for making the stud-weldable rebar 100 as shown in FIGS. 1-4 and as discussed above will now be described. The method includes providing a steel rebar body 102 with first and second ends 104, 106 and a diameter D. Ignoring the height H of any ribs/deformations that may be present, and/or any other optional surface features of the rebar body 102 (e.g., chamfered edge portion 116 described in further detail above), the rebar diameter D should be substantially uniform at all points along length LA.

The chemical composition of the steel material which forms the rebar body 102 should conform to the requirements of ASTM A706/A706M and should also provide a CEV in the range of about 0.31-0.42%, such as the chemical composition detailed in Table 2 above. The method continues by rapidly heating and cooling a portion of the weld end 106 to form hardened zone 120. Stated another way, the method continues with increasing the hardness at the tip portion 122 of weld end 106 by about 1.5-3 times the hardness of the base portion 124 of rebar body 102, including about 2-2.5 times the hardness. Stated yet another way, the hardness at zone 120 of the tip portion 122 at weld end 106 is increased by about 120-150%. The length $L_Z$ of the hardened zone 120 is chosen to be about 30-50% the diameter D of the rebar, including about 40% the diameter D of the rebar. The tip portion 122 at the weld end 106 can include a chamfered edge 116 formed between outer rebar surface 108 and terminal surface 114, and the chamfered edge extends a length $L_E$ that is about 20-45% the length $L_Z$ of the hardened zone, including about 22.5-40%. The tip portion 122 is also provided with a flux load 118 fixed to the terminal surface 114 at the weld end 106, and the flux load has a length $L_F$ that is about 10-25% the length of the hardened zone $L_Z$, including about 12.5-20%. Preferred hardened zone sizes, chamfered edge sizes, and flux load sizes for common rebar diameters and lengths are further detailed in Table 1 above.

The hardening process uses induction heating to rapidly heat a portion of the rebar tip 122 at the weld end 106. The rebar tip portion is heated until it reaches a target temperature which enables transformation to martensite. In specific embodiments, induction heating is applied for a period of about 4-9 seconds, until a target temperature of about 1,300-1,700° F. is reached. After induction heating, the heated weld end portion is allowed to rest for a dwell time of about 2 seconds. Immediately thereafter, the weld end portion is cooled by quenching in a cooling medium for a period of about 5-12 seconds. As a result, a martensitic microstructure is formed at zone 120 which preferably has a consistent Rockwell hardness from the outer surface to the core of the rebar body 102 of about 20-50 HRC. Exemplary preferred sizes for the flux load 118 and chamfered edge 116 (if one is desired) are also provided in Table 1 above. Once the preceding method is complete, rebar 100 is provided with a weld end 106 which can be stud-welded to a base metal in a manner that conforms with industry standards, such as those as set forth in at least AWS D1.1/1.1M and ACI 318-14. Preferred burn-off parameters for making such a weld are detailed in Table 1 above.

In existing rebar products, the stud-welding process itself can significantly increase the hardness and strength at the tip or weld region. However, the remaining portion of rebar does not see a significant change in physical properties compared to the weld region. As a result, a disparity in physical properties can occur in existing rebar products, and this disparity can increase the likelihood of failure at the weld region. In contrast, by pre-hardening the weld ends as discussed herein, the pre- and post-weld physical properties can be better controlled. As a result, significant disparities in hardness/strength and the risk of failure at the weld connection are eliminated or reduced. Moreover, some guiding principles of welded connections are satisfied, including that the weld connection should be formed to have both: (a) a tensile strength which ensures the weld is not the weakest link; and (b) a yield strength close to the that of the parent rebar so that accepted deformation requirements are met. Finally, by providing rebar with stud-weldability enabled at least in-part through the use of hardened weld ends as discussed herein, the comparatively time-consuming pre-treatment or physical deformation steps often required in the prior art to assemble or install rebar are eliminated.

The exemplary embodiment has been described with reference to the preferred embodiments. Obviously, modifications and alterations will occur to others upon reading and understanding the preceding detailed description. It is intended that the exemplary embodiment be construed as including all such modifications and alterations insofar as they come within the scope of the appended claims or the equivalents thereof.

The invention claimed is:

1. A stud-weldable rebar comprising:
 a steel body having a weld end and a diameter that is substantially uniform along a length of the steel body; and,
 a tip portion at the weld end and a base portion formed of the remaining steel body, the tip portion including a hardened zone,
 wherein the hardened zone has a hardness about 1.5-3.0 times greater than a hardness of the base portion.

2. The stud-weldable rebar of claim 1, wherein the hardness of the hardened zone is about 2-2.5 times greater than the hardness of the base portion.

3. The stud-weldable rebar of claim 1, wherein the hardness of the hardened zone is about 20-50 HRC.

4. The stud-weldable rebar of claim 1, wherein the hardened zone has a length that is about 30-50% the diameter of the steel body.

5. The stud-weldable rebar of claim 4, wherein the length of the hardened zone is about 40% the diameter of the steel body.

6. The stud-weldable rebar of claim 4, wherein the tip portion further comprises a terminal surface at the weld end and a chamfered edge adjacent to the terminal surface, the chamfered edge extending a length that is about 20-45% of the length of the hardened zone.

7. The stud-weldable rebar of claim 6, wherein the chamfered edge length extends about 22.5-40% of the length of the hardened zone.

8. The stud-weldable rebar of claim 4, wherein the tip portion further comprises a terminal surface at the weld end and a flux load fixed to the terminal surface, the flux load having a length that is about 10-25% of the length of the hardened zone.

9. The stud-weldable rebar of claim 8, wherein the length of the flux load is about 12.5-20% of the length of the hardened zone.

10. The stud-weldable rebar of claim 1, wherein the steel body has a chemical composition comprising 0.08-0.23 wt % of carbon, 0.95-1.2 wt % of manganese, less than 0.25 wt % of copper, less than 0.15 wt % of nickel, less than 0.15 wt % of chromium, 0.001-0.05 wt % of molybdenum, and 0.03-0.08 wt % vanadium.

11. The stud-weldable rebar of claim 1, wherein the steel body has a chemical composition comprising 0.08-0.23 wt % of carbon, 0.95-1.2 wt % of manganese, less than 0.04 wt % of phosphorous, less than 0.05 M % of sulfur, 0.2-0.4 wt % of silicon, less than 0.25 wt % of copper, less than 0.15 wt % of nickel, less than 0.15 wt % of chromium, 0.001-0.05 wt % of molybdenum, 0.001-0.02 wt % of aluminum, 0.03-0.08 wt % vanadium, less than 0.0005 wt % of boron, and less than 0.02 wt % of nitrogen.

12. The stud-weldable rebar of claim 1, wherein the steel body has a chemical composition comprising a carbon equivalency value between 0.31-0.42%.

13. A stud-weldable rebar comprising:
 a steel body having a first end, a weld end, and a generally cylindrical outer surface, the outer surface defining a diameter that is substantially uniform along all points of the steel body;
 a tip portion at the weld end, the tip portion including a hardened zone, a terminal surface, and a flux load fixed to the terminal surface; and,
 a base portion defined between the first end and the tip portion of the steel body,
 wherein the hardened zone has a length that is about 30-50% of the diameter of the steel body and a hardness that is about 1.5-3.0 times greater than a hardness of the base portion of the steel body.

14. The stud weldable rebar of claim 13, wherein the hardness of the hardened zone is about 20-50 HRC and the hardness of the base portion is about 90-98 HRB.

15. The stud-weldable rebar of claim 13, wherein the length of the hardened zone is about 0.150-0.400 inch.

16. A stud-weldable rebar comprising:
 a steel body having a weld end; and,
 a tip portion at the weld end and a base portion formed of the remaining steel body, the tip portion including a hardened zone,
 wherein the hardened zone has a hardness about 1.5-3.0 times greater than a hardness of the base portion; and
 wherein the steel body has a chemical composition comprising 0.08-0.23 wt % of carbon, 0.95-1.2 wt % of manganese, less than 0.25 wt % of copper, less than 0.15 wt % of nickel, less than 0.15 wt % of chromium, 0.001-0.05 wt % of molybdenum, and 0.03-0.08 wt % vanadium; and
 wherein the chemical composition comprising a carbon equivalency value of about 0.31% to about 0.42%.

17. The stud-weldable rebar of claim 16, wherein the steel body has a diameter that is substantially uniform along a length of the steel body; and wherein the diameter is ⅜", ½", ⅝", ¾", ⅞", or 1".

18. The stud-weldable rebar of claim 17, wherein the hardened zone has a length that is about 30-50% the diameter of the steel body.

19. The stud-weldable rebar of claim 18, wherein the tip portion further comprises a terminal surface at the weld end and a chamfered edge adjacent to the terminal surface, the chamfered edge extending a length that is about 20-45% of the length of the hardened zone.

20. The stud-weldable rebar of claim 18, wherein the tip portion further comprises a terminal surface at the weld end and a flux load fixed to the terminal surface, the flux load having a length that is about 10-25% of the length of the hardened zone.

* * * * *